United States Patent [19]

Becker et al.

[11] Patent Number: 5,463,020

[45] Date of Patent: Oct. 31, 1995

[54] PREPARATION OF POLYTETRAHYDROFURAN OR TETRAHYDROFURAN/ALKYLENE OXIDE COPOLYMERS

[75] Inventors: Rainer Becker, Bad Duerkheim; Michael Huellmann, Heppenheim; Christof Palm, Ludwigshafen; Wolfgang Franzischka, Frankenthal, all of Germany

[73] Assignee: BASF Aktiengesellschaft, Ludwigshafen, Germany

[21] Appl. No.: 268,954

[22] Filed: Jun. 30, 1994

[30] Foreign Application Priority Data

Jul. 26, 1993 [DE] Germany ............ 43 25 023.8

[51] Int. Cl.⁶ ............ C08G 65/20; C08G 65/10
[52] U.S. Cl. ............ 528/408; 568/617; 560/82; 560/90; 560/91; 560/93; 560/112; 560/200; 560/240
[58] Field of Search ............ 528/408; 568/617; 560/82, 90, 91, 93, 112, 200, 240

[56] References Cited

U.S. PATENT DOCUMENTS

| | | | |
|---|---|---|---|
| 2,499,725 | 2/1948 | Copelin | 260/496 |
| 2,782,233 | 2/1957 | Muetterties | 568/617 |
| 3,358,042 | 12/1967 | Dunlop et al. | 260/615 |
| 4,189,566 | 2/1980 | Mueller et al. | 528/408 |
| 4,259,531 | 3/1981 | Huchler et al. | 568/617 |
| 5,034,423 | 7/1991 | Blount | 521/107 |

FOREIGN PATENT DOCUMENTS

| | | |
|---|---|---|
| 0126471 | 11/1984 | European Pat. Off. |
| 0158229 | 10/1985 | European Pat. Off. |
| 535588 | 4/1993 | European Pat. Off. |
| 3128962 | 2/1983 | Germany |
| 2760272 | 4/1987 | Germany |

OTHER PUBLICATIONS

Derwent abstract, JP–A 58,204,026.
Angew. Chem. vol. 72 (1960) p. 927.

*Primary Examiner*—Frederick Krass
*Attorney, Agent, or Firm*—John H. Shurtleff

[57] ABSTRACT

Polytetrahydrofuran or $C_2$–$C_{10}$-alkylene oxide/tetrahydrofuran copolymers having a molecular weight of from 250 to 20,000 Dalton are prepared by the cationic polymerization of tetrahydrofuran or tetrahydrofuran and $C_2$–$C_{10}$-alkylene oxides in the prsence of a promoter by a process in which the catalyst used is a mixture of one or more $C_2$–$C_6$-di- or tricarboxylic acids with boric acid.

10 Claims, No Drawings

PREPARATION OF POLYTETRAHYDROFURAN OR TETRAHYDROFURAN/ALKYLENE OXIDE COPOLYMERS

The present invention relates to a process for the preparation of polytetrahydrofuran or $C_2$–$C_{10}$-alkylene oxide/tetrahydrofuran copolymers having an average molecular weight of from 250 to 20,000 Dalton by the cationic polymerization of tetrahydrofuran or tetrahydrofuran and $C_2$–$C_{10}$-alkylene oxides in the presence of a promoter.

Polytetrahydrofuran (PTHF) and THF/alkylene oxide copolymers having an average molecular weight of from 250 to 20,000 Dalton are widely used for the preparation of polyurethanes, polarureas and polyamides, on the one hand serving as diol components for the production of these polymers and on the other hand, as a result of the particular flexibility of the polyoxybutylene chain, imparting resilience to the polymer prepared thereby and acting as a flexible segment in the relevant polymers.

The cationic polymerization of tetrahydrofuran (THF) with the aid of catalysts was described by Meerwein et al. (Angew. Chem. 72 (1960), 927). The catalysts used are either premolded catalysts, or the catalysts are produced in situ in the reaction mixture. This is done by producing oxonium ions, which initiate the polymerization of the THF, in the reaction medium with the aid of strong Lewis acids, such as boron trichloride, aluminum chloride, tin tetrachloride, antimony pentachloride, iron (III) chloride or phosphorus pentafluoride, or by means of strong Brönsted acids, such as perchloric acid, tetrafluoboric acid, fluorosulfonic acid, chlorosulfonic acid, hexachlorostannic acid, iodic acid, hexachloroantimonic acid or tetrachloroferric acid, and with the aid of reactive compounds referred to as promoters, such as alkylene oxides, e.g. ethylene oxide, propylene oxide, epichlorohydrin or butylene oxide, oxetanes, orthoesters, acetals, α-haloethers, benzyl halides, triarylmethyl halides, acyl chlorides, β-lactones, carboxylic anhydrides, thionyl chloride, phosphoryl chloride or sulfonyl halides.

Depending on the the of promoters used, they may be incorporated in the PTHF as telogens, ie. as terminal groups, or polymerized in the polymer as comonomers, THF/promoter copolymers being formed. For example, acetic anhydride acts as a telogen and, when used as a promoter, initially results in PTHF diacetate, from which PTHF is formed by the subsequent elimination of the acetyl groups. On the other hand, alkylene oxides and oxetanes act as comonomers, which are incorporated in the polymer chain during polymerization and give THF/alkylene oxide or THF/oxetane copolymers. Small amounts of reagents which cause chain termination in the polymerization reaction, for example water, alcohols or carboxylic acids, are also added to the polymerization mixture in order to regulate the average molecular weight of the copolymer thus formed.

However, from the large number of these catalyst systems, only a few have become industrially important, since some of them are highly corrosive and/or, in the preparation of the PTHF, lead to discolored PTHF products of only limited use. Moreover, many of these catalyst systems do not act as catalysts in the actual sense but must be used in stoichiometric amounts, based on the macromolecule to be prepared, and are consumed during the polymerization. For example, in the preparation of PTHF with fluorosulfonic acid as the catalyst according to U.S. Pat. No. 3,358,042, two molecules of fluorosulfonic acid must be used as catalyst per molecule of PTHF. A particular disadvantage of the use of halogen-containing catalyst systems is that they lead to the formation of halogenated byproducts in the PTHF preparation, which are very difficult to separate from the pure PTHF and have an adverse effect on the properties of the latter.

EP-A 3 112 describes the preparation of PTHF over heterogeneous bleaching earth catalysts with the aid of promoters such as acetic anhydride. In this process, PTHF of very good quality is obtained but the activity of the bleaching earth catalysts and hence the space-time yield in the PTHF preparation are capable of being improved.

EP-A 126 471 and EP-A 158 229 use heteropolyacid catalysts for the preparation of PTHF. These processes likewise have the disadvantage that the space-time yield of PTHF is unsatisfactory due to the low catalyst activity. A further disadvantage is the fact that the heteropolyacid catalyst dissolves in small amounts in the PTHF product, causes discoloration and other chemical changes therein, and therefore must be removed from the PTHF product by means of a complex separation process.

It is an object of the present invention to provide a process for the preparation of PTHF or THF/alkylene oxide copolymers which does not have the disadvantages of the abovementioned processes. In particular, it is intended to provide a catalyst which catalyses the polymerization of THF with high activity without causing halogenation or other secondary reactions of the PTHF product.

We have found that this object is achieved by a process for the preparation of polytetrahydrofuran or $C_2$–$C_{10}$-alkylene oxide/tetrahydrofuran copolymers having an average molecular weight of from 250 to 20,000 Dalton by the cationic polymerization of tetrahydrofuran or tetrahydrofuran and $C_2$–$C_{10}$-alkylene oxides in the presence of a promoter, wherein the catalyst used is a mixture of one or more $C_2$–$C_6$-di- or tricarboxylic acids with boric acid.

In the novel process, mixtures of boric acid and an aliphatic $C_2$–$C_6$-di- or tricarboxylic acid are therefore used as the catalyst. The di- or tricarboxylic acid may be unsubstituted or may carry 1 or 2 $C_1$–$C_4$-alkyl groups and/or hydroxyl groups as substituents. Examples of di- or tricarboxylic acids which may be used according to the invention are oxalic acid, malonic acid, succinic acid, malic acid, tartaric acid and citric acid. Mixtures of boric acid and oxalic acid are particularly preferably used as catalysts. Mixtures of various di- or tricarboxylic acids with boric acid can of course also be used as catalysts in the novel process.

In the novel catalysts, the molar ratio of boric acid to di- and/or tricarboxylic acid is from 1:10 to 10:1, preferably from 1:0.5 to 1:5, particularly preferably from 1:1 to 1:3. The catalyst, ie. the mixture of boric acid and di- and/or tricarboxylic acid, is added to the reaction mixture in general in an amount of from 0.01 to 10, preferably from 0.1 to 1.5, % by weight, based on the amount of the THF used.

Although the polymerization of THF to PTHF also takes place without the addition of a promoter, in the novel process a promoter is generally added to the reaction mixture to accelerate the reaction. Promoters usually used for the polymerization of THF may be employed as promoters, for example alkylene oxides, oxetanes, orthoesters, acetals, α-haloethers, benzyl halides, triarylmethyl halides, acyl chlorides, β-lactones, carboxylic anhydrides, thionyl chloride, phosphoryl chloride or sulfonyl halides. Halogen-free promoters, such as $C_2$–$C_{10}$-alkylene oxides, preferably 1,2-alkylene oxides, for example ethylene oxide, propylene oxide, 1,2-butylene oxide or 2,3-butylene oxide, oxetanes or carboxylic anhydrides, such as acetic anhydride or the anhydrides of propionic acid, butyric acid, valeric acid, caproic acid, caprylic acid, pelargonic acid, succinic acid, maleic acid, benzoic acid or phthalic acid, are preferably used in the novel process. A particularly preferred promoter is acetic anhydride. The promoters are added to the reaction mixture in general in amounts of from 0.1 to 20, preferably from 1 to 15, particularly preferably from 3 to 10, mol %, based on the THF used.

The promoters are generally incorporated as telogens at the beginning and end of the PTHF macromolecule. molecule. If, on the other hand, oxiranes or oxetanes are used as promoters, they may also be incorporated as comonomers in the resulting polymer chain, the corresponding THF/$C_2$-$C_{10}$-alkylene oxide copolymers being formed.

The molar ratio of the amount of THF used and the amount of alkylene oxide in the preparation of THF/$C_2$-$C_4$-alkylene oxide copolymers is in general from 15:1 to 2:1, preferably from 10:1 to 5 1. The addition of the alkylene oxide to the polymerization mixture is advantageously controlled in such a way that the concentration of said alkylene oxide in the polymerization mixture is not more than 2% by weight. Advantageously, the molar ratio of the monomers THF and alkylene oxide is kept substantially constant during the predominant part of the reaction time, in particular for from 80 to 99% of the total reaction time. However, the concentration of the alkylene oxide in the polymerization mixture may decrease to 0 during the subsequent reaction time owing to its complete conversion. In order to keep the alkylene oxide concentration substantially constant during the polymerization, the alkylene oxide is generally added to the polymerization mixture at the rate at which it is consumed during the polymerization. The amount of alkylene oxide which is converted during the entire polymerization may vary within very wide limits. Copolymers which can be processed to give interesting end products contain, for example, from 5 to 50, in particular from 10 to 30, % by weight of alkylene oxide. After the end of the reaction, no free alkylene oxide should be present in the polymerization mixture, whereas excess THF, which in the absence of a promoter is not further polymerized by the catalyst, may serve as a solvent for the copolymer. The concentration of the copolymer in the THF may be, for example, from 30 to 60% by weight.

To establish the average molecular weight of the copolymers to be prepared in this manner, chain terminators are as a rule also added to the polymerization mixture. The abovementioned promoters may serve as such chain terminators, and water, $C_1$-$C_{10}$-alcohols, preferably tert-butanol or benzyl alcohols, or $C_1$-$C_{10}$-carboxylic acids, preferably formic acid, may additionally be used as chain terminators. In the preparation of the THF/alkylene oxide copolymers, the chain terminators are added to the polymerization mixture in general in amounts of from 20 to 0.1, preferably from 10 to 0.5, particularly preferably from 5 to 1, mol %, based on the amount of THF.

The THF is polymerized using the novel catalyst system in general at from 0° C. to the boiling point of the THF, preferably at from 30° to 60° C., at atmospheric or superatmospheric pressure, for example under the autogenous pressure of the reaction system.

The catalyst may be added to the reaction mixture as a prepared mixture or in the form of its individual components. The process may be carried out continuously, for example in tube reactors, or batchwise, for example in stirred kettles. Since the novel catalyst dissolves in the reaction mixture to give a homogeneous solution, conventional reactors may be used.

The PTHF may be isolated in a conventional manner, for example by precipitating the catalyst by means of a mineral base, for example an alkaline earth metal hydroxide or carbonate, separating off the precipitated catalyst and isolating the PTHF after distilling off the readily volatile components of the reaction mixture.

In the novel process, PTHF having an average molecular weight $M_n$ of from 250 to 20,000, preferably from 400 to 5,000, Dalton or THF/$C_2$-$C_4$-alkylene oxide copolymers having an average molecular weight of from 250 to 20,000, preferably from 400 to 5,000, Dalton can be advantageously prepared. This result is very surprising since it has been possible to date to polymerize PTHF only with the aid of strong Brönsted or Lewis acids and since the two components of the novel catalyst system, boric acid and $C_2$-$C_6$-di- or tricarboxylic acid, result in completely insufficient THF conversions when they are used alone, instead of in combination with one another, as catalysts.

The PTHF derivatives obtainable by the novel process, for example the PTHF dicarboxylates, can be converted into PTHF in a conventional manner, for example by transesterification with methanol according to U.S. Pat. No. 2,499, 725 or DE-A 27 60 272.

THF is a major chemical product and can be produced, for example, by the process as described in Ullmanns Enzyklopädie der technischen Chemie, Volume 12, pages 20 to 21, Verlag Chemie, Weinheim 1976. Boric acid is prepared by reacting borates with mineral acids. Industrial processes for this purpose are described in Ullmanns Enzyklopädie der technischen Chemie, Volume 8, pages 666 to 668, Verlag Chemie, Weinheim 1974. $C_2$-$C_6$-di- or tricarboxylic acids are natural products and can, for example, be prepared microbiologically or obtained by extraction of plant material. Furthermore, there are a number of chemical processes for the preparation of these acids, for example, for oxalic acid, those described in Ullmanns Enzyklopädie der technischen Chemie, volume 17, pages 475 to 482, Verlag Chemie, Weinheim 1979.

Promoters such as carboxylic anhydrides may be prepared, for example, by thermal dehydration of carboxylic acids or by reaction of carboxylic acids with acyl chlorides. The simplest carboxylic anhydride, acetic anhydride, is produced industrially by reacting ketene with acetic acid or by a modified acetaldehyde oxidation (cf. Weissermel and Arpe: Industrielle organische Chemie, 3rd Edition, pages 192 to 195, VCH Verlagsgesellschaft, Weinheim 1988).

EXAMPLES

The average molecular weight $M_n$ of the PTHF was determined by gel permeation chromatography. It is defined by the equation $$M_n = \frac{\Sigma c_i}{\Sigma \dfrac{c_i}{M_i}}$$

where $c_i$ is the concentration of the individual polymer species i in the polymer mixture obtained and $M_i$ is the molecular weight of the individual polymer species i. The molecular weight distribution, referred to below as dispersity D, was calculated from the ratio of weight average molecular weight ($M_w$) to number average molecular weight ($M_n$), according to the equation $$\frac{M_w}{M_n} = D.$$

The weight average molecular weight $M_w$ was determined from the resulting chromatograms with the aid of the formula $$M_w = \frac{\Sigma c_i M_i}{\Sigma c_i}.$$

EXAMPLE 1

1,400 g of commercial THF and 138.5 g of acetic anhydride were initially introduced together with 4 g of boric acid and 11.4 g of oxalic acid in a stirred flask. The mixture was heated to 50° C. while stirring and was kept at this temperature. At certain time intervals, aliquot amounts were taken from the reaction vessel and the polymerization reaction was terminated by adding a calcium hydroxide solution. The resulting salts were filtered off, the amount of PTHF diacetate formed was determined after distilling off low boilers from the reaction mixture, and the conversion based on THF was calculated therefrom.

THF conversion was 24.3% after a reaction time of 5 minutes, 44.5% after 20 minutes and 55.0% after 40 minutes.

The average molecular weight of the PTHF di-acetate thus obtained was 792 Dalton.

EXAMPLE 2

1% by weight, based on the THF used, of a polymerization catalyst was added to each of three batches, each comprising 1,400 g of THF and 138.5 g of acetic anhydride, in a stirred flask, and the mixture was stirred in each case for 20 hours at 20° C. Catalyst I consisted of a boric acid, catalyst II of pure oxalic acid and catalyst III of a mixture of boric acid with oxalic acid in a molar ratio of 1:2. The reaction mixture was worked up as described in Example 1.

After a reaction time of 20 hours, the THF conversion was 3.5% with catalyst I, 2.7% with catalyst II and 71.9% with the novel catalyst III.

EXAMPLE 3

1,000 g of THF, 10 g of water and 10 g of a boric acid/oxalic acid mixture (molar ratio 1:2) were initially introduced into a stirred three-necked flask. 190 g of gaseous ethylene oxide were passed in at 50° C. in the course of 7 hours. After the end of the addition of the ethylene oxide, stirring was carried out for a further 30 minutes, after which the catalyst was precipitated by adding $Ca(OH)_2$ and the precipitate was filtered off, these tests being carried out as in Example 1. Unconverted THF was distilled off from the filtrate under reduced pressure. 281 g of a copolymer which had an average molecular weight $M_n$ of 600 Dalton and a dispersity of 1.62 were obtained (conversion 27.5%, based on THF). After short-chain oligomers had been separated off by distillation under greatly reduced pressure, the average molecular weight $M_n$ was 738 Dalton and the dispersity was 1.36.

We claim:

1. In a process for the preparation of a polytetrahydrofuran or a tetrahydofuran/$C_2$–$C_{10}$-alkylene oxide copolymer having a molecular weight of from 250 to 20,000 Dalton by the cationic polymerization of tetrahydrofuran alone or with a $C_2$–$C_{10}$-alkylene oxide, optionally in the presence of a promoter, the improvement which comprises:

carrying out said polymerization using as the catalyst a mixture consisting of boric acid and at least one di- or tricarboxylic acid.

2. A process as claimed in claim 1, wherein the molar ratio of boric acid to said at least one di- or tricarboxylic acid is from 1:10 to 10:1.

3. A process as claimed in claim 1, wherein the catalyst is used in an amount of from 0.01 to 10% by weight, based on the amount of tetrahydrofuran.

4. A process as claimed in claim 1, wherein oxalic acid is used as the di- or tricarboxylic acid.

5. A process as claimed in claim 1, wherein the molar ratio of boric acid to said at least one di- or tricarboxylic acid is from 1:0.5 to 1:5.

6. A process as claimed in claim 1, wherein the molar ratio of boric acid to said at least one di- or tricarboxylic acid is from 1:1 to 1:3.

7. A process as claimed in claim 6, wherein oxalic acid is used as the di- or tricarboxylic acid.

8. A process as claimed in claim 1, wherein the polymerization reaction is promoted by the addition of a carboxylic anhydride.

9. A process as claimed in claim 1, wherein the catalyst is used in an amount of from 0.1 to 1.5% by weight, based on the amount of tetrahydrofuran.

10. A process as claimed in claim 1, wherein the catalyst is a mixture of boric acid and oxalic acid in a molar ratio of boric acid to oxalic acid of from 1:10 to 10:1, the catalyst being used in an amount of from 0.01 to 10% by weight, based on the amount of tetrahydrofuran.

\* \* \* \* \*